(12) United States Patent
Weinbrenner

(10) Patent No.: US 6,774,600 B2
(45) Date of Patent: Aug. 10, 2004

(54) MATRIX CONNECTED DRIVER FOR MULTIPLE TWO PHASE MOTORS

(76) Inventor: Richard L. Weinbrenner, 15848 W. 132nd St., Lemont, IL (US) 60438

( * ) Notice: Subject to any disclaimer, the term of this patent is extended or adjusted under 35 U.S.C. 154(b) by 88 days.

(21) Appl. No.: 10/288,164

(22) Filed: Nov. 5, 2002

(65) Prior Publication Data

US 2003/0085675 A1 May 8, 2003

Related U.S. Application Data

(60) Provisional application No. 60/338,580, filed on Nov. 5, 2001.

(51) Int. Cl.[7] ................................................ H02P 8/40
(52) U.S. Cl. ...................... 318/696; 318/34; 318/498; 318/558
(58) Field of Search ................................. 318/685, 696, 318/34, 82, 83, 111, 112, 113, 494, 495, 496, 497, 498, 558

(56) References Cited

U.S. PATENT DOCUMENTS

| | | | | |
|---|---|---|---|---|
| 4,284,208 A | * | 8/1981 | Levasseur | 221/129 |
| 4,961,507 A | * | 10/1990 | Higgins | 221/129 |
| 5,023,527 A | | 6/1991 | Erdman et al. | |
| 5,087,867 A | * | 2/1992 | Kruppa | 318/696 |
| 6,265,842 B1 | * | 7/2001 | Hard et al. | 318/466 |
| 6,297,610 B1 | * | 10/2001 | Bauer et al. | 318/562 |
| 6,603,647 B2 | * | 8/2003 | Briesen et al. | 361/91.1 |

* cited by examiner

*Primary Examiner*—Bentsu Ro
(74) *Attorney, Agent, or Firm*—Jeffrey P. Calfa

(57) ABSTRACT

A matrix-connected driver for multiple two-phase motors includes circuit rows and columns of input and output connections for the phases of networked two-phase motors. Phases of multiple motors share the same input line and phases of multiple motors share the same output line but no motor phase shares both the same input and the same output. Buffers that may be transistors power each input and output line. The input and output lines may be alternatively positively powered high or grounded low using the buffers. In this fashion individual phases may be singly powered using selected pairs of the buffers without causing the other phases to be powered whether high or low. A processor such as a microprocessor drives the buffers. The usage of common input and output lines or otherwise referred to as columns and rows allows the same number of motors to be single phase mode driven with much less wires. The device is particularly effective for driving multiple motors whereby the electronics are not in the same environment as the motors. This may be motivated due to extreme temperatures, radiation, or remoteness of the environment, so that the chance of a requirement to access the hostile environment will be minimized.

23 Claims, 4 Drawing Sheets

MATRIX CONNECTED DRIVER FOR MULTIPLE TWO PHASE MOTORS

This is a non-provisional patent application claiming the priority of provisional patent application Serial No. 60/338,580, filed Nov. 5, 2001.

BACKGROUND OF THE INVENTION

Certain applications require remote or automated adjustment of parameters or alignments, which are effected by mechanical or electromechanical adjusters. In this case an electric motor maybe used. In certain applications it is imperative that the motor drive electronics not be in proximity to the adjustment mechanism. In such cases a large number of motors can require a large number of wires to connect the motors to the driver, especially brushless motors that are commutated by the electronic drive circuit.

A step motor's shaft has permanent magnets or magnetic material attached to it called a rotor or core. Around the body of the motor is a series of coils that create a magnetic field that interacts with the permanent magnets. When these coils are turned on or off in a certain sequence, the motor will rotate forward or reverse. This is called the phase pattern and there are several types that will cause the motor to turn. A less common of these modes is the Single Phase Mode Driven mode. To make a step motor rotate, you must constantly turn on and off the coils. If you simply energize one coil, the motor will jump to that position and stay there resisting change. Step motors can be controlled using digital computers or processors because the computers can control the motors by turning on and off the coils. The computer energizes the coils in a certain pattern and the motor will move accordingly.

Large multiples of motors can result in a number of wires do to the need to turn on and off and reverse individual coils. As an example, if a system of 60 bipolar step motors were required, then one would expect to connect 240 wires between the electronic driver and the motors, since each motor has 4 wires (60×4), two for each phase. However this invention permits this large number of drive wires to be reduced to 22 wires thereby reducing the cabling costs when it is necessary to place the electronic drive remote from the motors.

SUMMARY OF THE INVENTION

One general object of the invention is to provide a separable driver with reduced circuit requirements to drive a large number of motors connected by a minimized number of wires. A second object of the invention is to lower the cost of the electronic circuitry to drive said motors. A third object of the invention of to provide an economical method for driving the large number of motors whereby the electronics are not in the same environment as the motors. This may be motivated due to extreme temperatures (high or low), radiation, or remoteness of the environment, so that the chance of a requirement to access the hostile environment will be minimized. Only the rugged motors will be in the hostile environment, not more environmentally sensitive electronics.

The matrix-connected driver for multiple two-phase motors of this invention meets all of the above objectives as well as those not listed. The invention includes a circuit rows and columns of input and output connections for the phases of networked two-phase motors. Multiple motors share the same input line and multiple motors share the same output line but no motor phase shares both the same input and the same output. Buffers that may be transistors power each input and output line. The input and output lines may be alternatively positively powered high or grounded low using the buffers. In this fashion individual phases may be singly powered using selected pairs of the buffers without causing the other phases to be powered whether high or low. A processor such as a microprocessor drives the buffers. The usage of common input and output lines or otherwise referred to as columns and rows allows the same number of motors to be single phase mode driven with much less wires.

This invention is especially suitable where a large number of adjustments are to be set using the large number of motors where only one of the motors is run at a time. Although if the controller sequences through them it could appear they are all running at low speed. In some cases the instrument or apparatus might be built with the large number of adjustment motors mechanically built in and wired as described in this invention with the intention that the electronic controller for said motors is not normally shipped with nor built into said apparatus. This would result in a substantial cost savings. Then, using a reasonable sized number of conductors in the cable an adjustment controller can be brought to the site where it can be plugged into the apparatus, the adjustments or alignments can be made, and the controller may be disconnected. A properly mechanical design will thereafter hold its respective positions or alignments respective to each motor while disconnected and de-powered.

A particular application is the use of this invention to tune a super conducting multi-cavity RF filter. An RF filter built using multiple resonating cavities offers superior performance when built using hi temperature super conducting surfaces due to the zero resistance offered by super conductors. This system is enclosed in a vacuum-sealed enclosure. Even with the highest tolerance machining practice, it is still necessary to tune each of the cavities for optimum performance. Also, tuning a cavity can affect the tuning of the input cavity before and the output cavity after the cavity being adjusted, through coupling interactions, which requires a potentially tedious adjustment.

This procedure may be done while the filter assembly is in a normal air environment in a liquid nitrogen-cooled cooled environment. However, due to the difference of physical constants between air and vacuum, the filter must be 'off-tuned' in such a manner as to result in proper tuning once the unit is enclosed and operating in a vacuum chamber.

Turning a tuning stub, which consists of rotating a fine screw presently, performs the tuning, and when it is rotated it can protrude further into the cavity or less far into the cavity. Then a lock nut can be tightened to lock the adjustment in place. A large number of tuning adjustment stubs are required for a complete system. If these adjustments were to be motorized using two-phase stepper motors, it could require a very large number of wires be routed through the wall of the cabinet. Vacuum-sealed connectors are expensive and must be minimized.

DETAILED DESCRIPTION

This invention describes a system to reduce the number of wires. A number of approaches are available, including building the electronics into the super cooled vacuum chamber. Most electronic components are not characterized for operation down to 70° K, and designing circuits into that environment introduces difficulties and expense.

This invention uses step motors, mechanically customized to actuate the tuning stub. For example, for a system with 60 bipolar step motors, one would expect to connect 240 wires between the electronic driver and the motors, since each motor has 4 wires (60×4). However this invention permits this large number of drive wires to be reduced to 22 wires.

Figure 4:
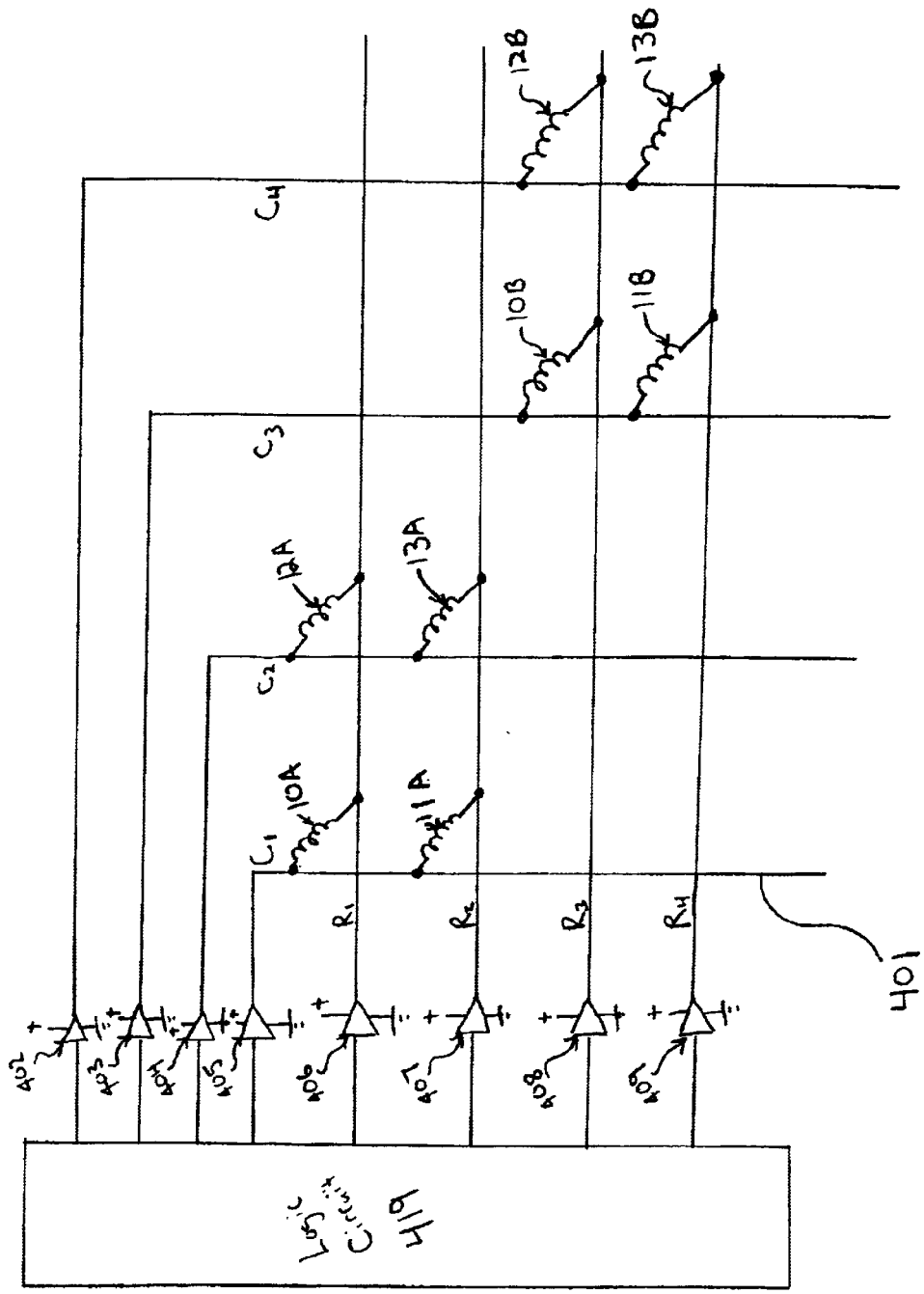
FIG. 4 is an embodiment of the invention using two matrices to allow for driving two motor coils simultaneously.

A step motor has two windings, generally referred to as phase A (PhA) or Phase B (PhB). The most common modes of driving a step motor is in full step mode or half step mode, which requires that both field or winding coils (phases) be energized at once. This configuration could be accomplished in two matrixes; one matrix for the PhA and a different matrix for the PhB. An example of this is shown in FIG. 4 and described below. In order to support up to 64 motors, this would require 16 wires for each phase matrix. That would be a total of 32 wires for both phases' drive of 64 motors. This technique might be useful in some instances, however we are motivated by this application to reduce the wires still further.

Choosing a one-phase-on full step drive for each step motor, results in combining both phases of all the motors into a single matrix. Now, the same 64 motors can be driven with a 12×11 matrix, which requires just 22 wires. The given customized solution might be modified one way or the other to accommodate various sized subassemblies, but this describes the basic concepts.

Figure 1:
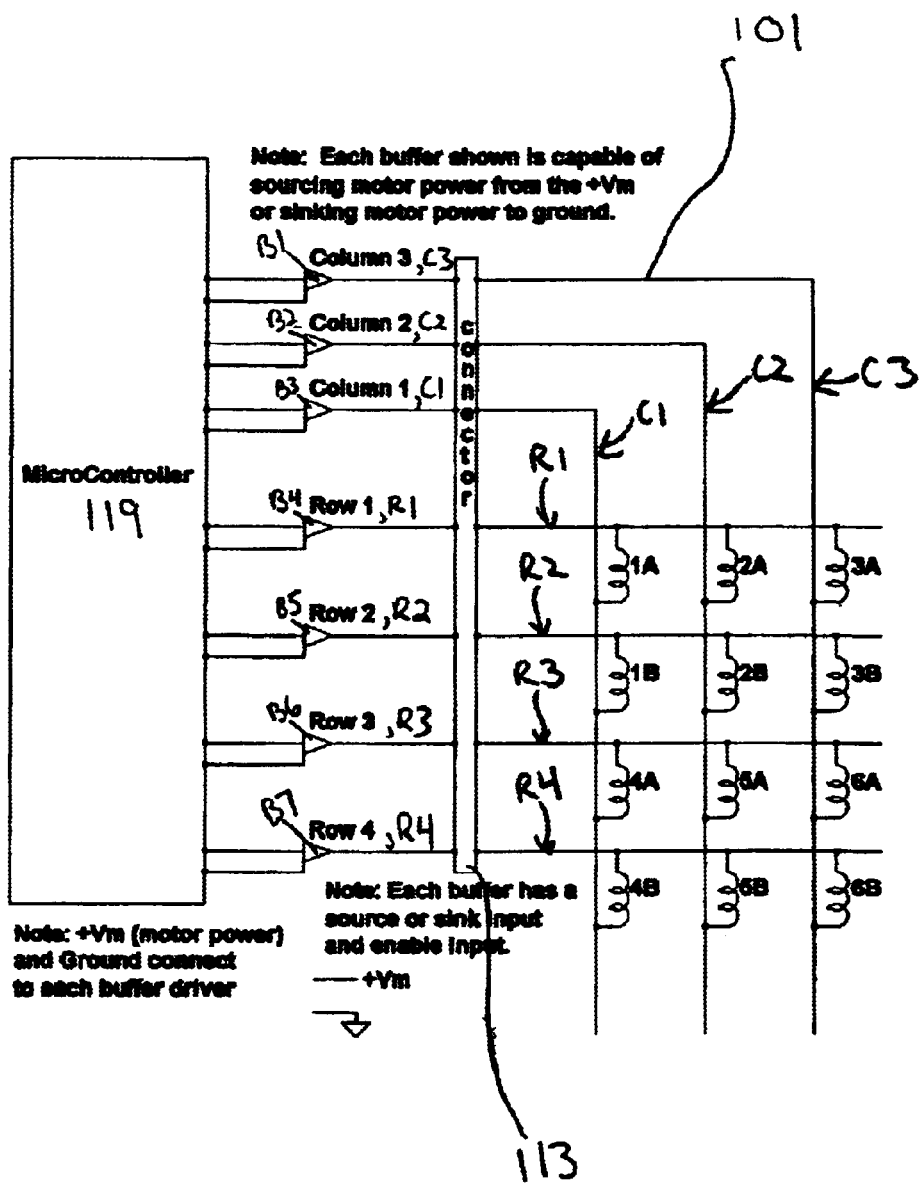
FIG. 1 is an embodiment of the matrix connected driver circuit for a large number of two-phase motors made in accordance with the invention.

An embodiment of the matrix-connected driver 101 of this invention is depicted in FIG. 1. A micro controller or microprocessor or other logic circuit 119 generates the drive sequences to be described. Logic level signals from the micro-controller 119 direct a specified buffer (driver), which can source the current to the motor coil or sink current from the motor coil. FIG. 1 includes Buffers B1, B2, B3, B4, B5, B6, and B7. The micro-controller 119 may select pairs of the buffers B1 to B7, to source one and sink the other in order to draw power across a specific motor coil.

The matrix shown in FIG. 1 contains the connections for 6 motors, designated Motors 1 to 6, and it can be clearly observed that the matrix can be extended in both rows, Row 1 to Row 4 (R1 to R4), and columns, Column 1 to Column 3 (C1 to C3). There may be a connector 113 between the buffers B1 to B7 and the motor 1 to 6 motor coils. The number of interconnections between the matrix and the micro-controller/driver circuit 119 is minimized if the number of rows and columns are as near equal as possible. In the example 2-phase step motors are depicted. Motor 1 consists of the coils labeled 1A and 1B, and coils labeled 2A and 2B together represent motor 2. The triangular symbol represents a buffer or driver, B1 to B7, capable of sourcing or sinking current from the power supply Vm through a motor coil. In practice this buffer can be constructed of electronic transistors or high power amplifier circuits. In practice certain protections to the circuit are required due to the fact it is driving an inductive load. Each buffer B1 to B7 has a source or a sink input and an enable input from the micro-controller 119.

In order to drive current downward through the coil 1A the micro-controller 119 presents a logic HI symbol to the buffer labeled Row 1 and a logic LOW signal to Column 1. This causes the B4 buffer at Row 1 to source current to the top of motor coil 1A, then flow out the bottom of 1A and sink to ground via the B3 buffer at Column 1.

Figure 2:
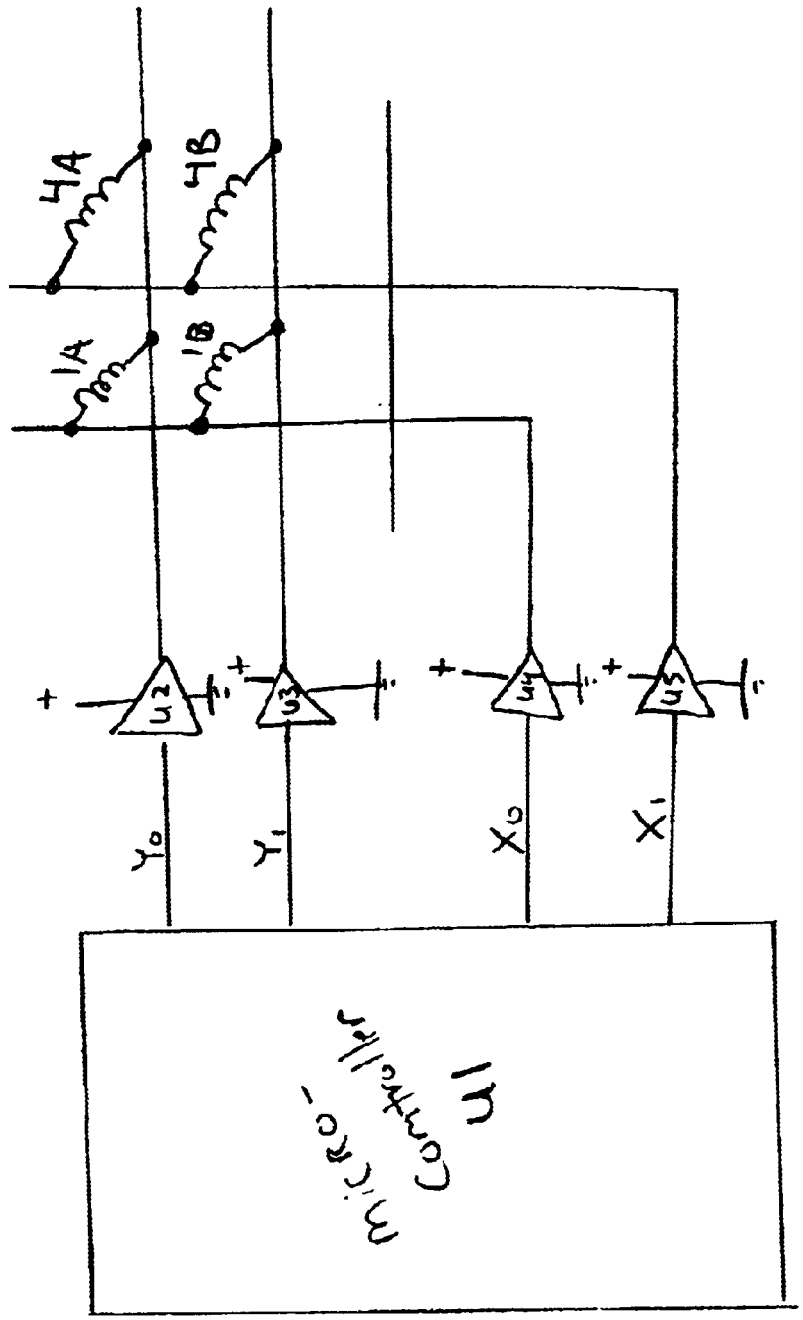
FIG. 2 is a second embodiment of the matrix connected driver circuit for four two-phase motors made in accordance with the invention.
Figure 3:
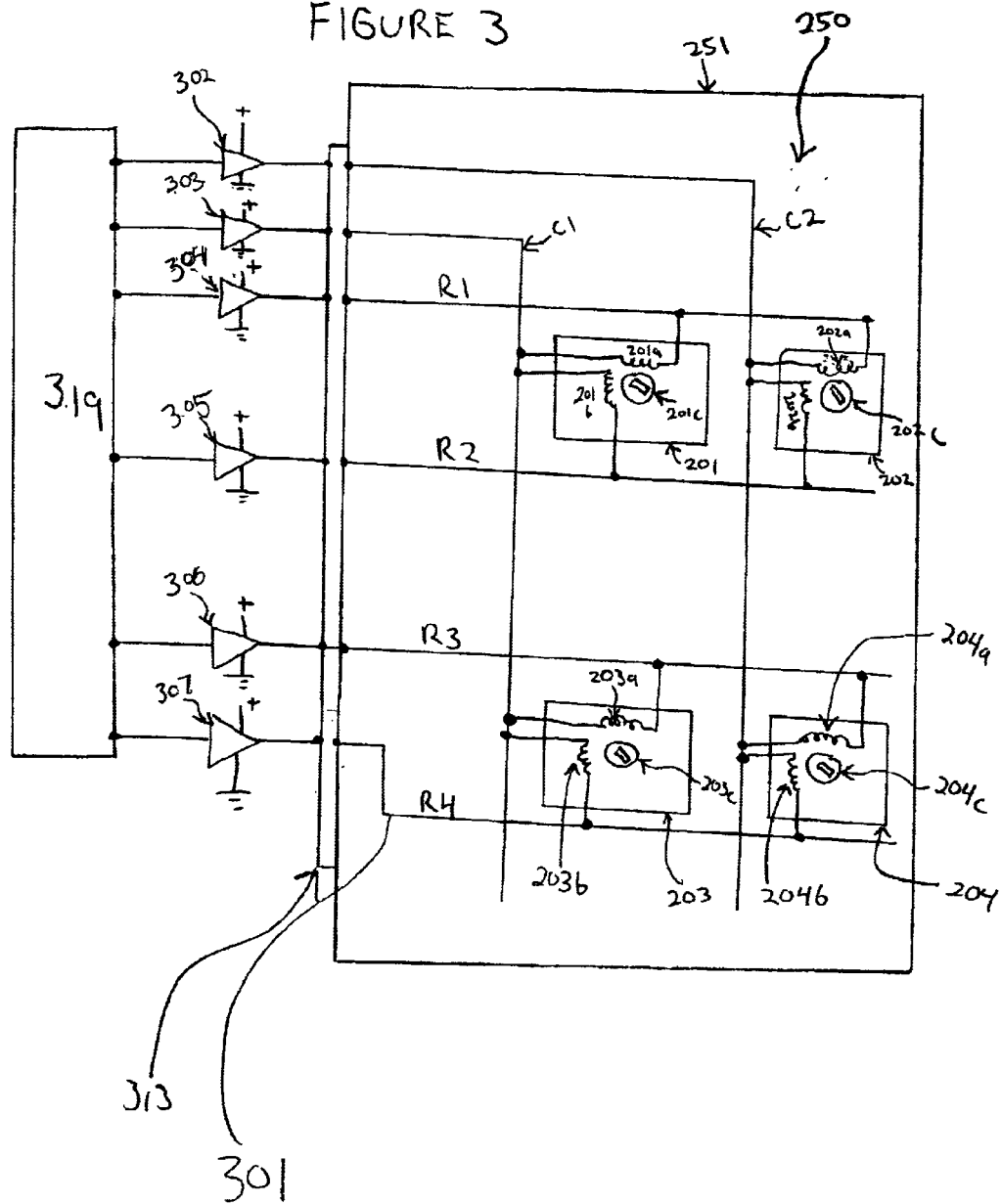
FIG. 3 an isolated mechanical system using the matrix connected driver of FIG. 2 to reposition four two phase motors all located within an isolated hostile environment.

The stepper motors, 1 to 6, and also those in FIGS. 2 and 3, are driven in "single phase on" mode. Often this mode of operation is less desirable since it produces less torque at the motor shaft than the "two phases on" mode. However the "single phase on" mode in this circuit yields benefits that outweigh the reduced torque.

The mode of operation to run step motor 1 follows the sequence defined in the table below. The shorthand notation is used such that C1=L indicates that the Column 1 driver will assert the low logic state, and R1=H indicates the Row 1 driver will assert the high logic state. All logic outputs not listed are 'Disabled'; neither sourcing nor sinking current.

| tep # | Column driver | Row driver | ph 1A | ph 1B |
|---|---|---|---|---|
| 1 | C1 = L | R1 = H | ↓ | |
| 2 | C1 = H | R2 = L | | ↑ |
| 3 | C1 = H | R1 = L | ↑ | |
| 4 | C1 = L | R2 = H | | ↓ |

The up arrow or down arrow symbols in column A and B indicate the polarity of the current flowing through the motor coils depicted in FIG. 1, for coil 1A for phase A (ph A) and coil 1B for phase B (ph B). If the cell in the table is blank then there is no current flow at all in that phase during the step # identified in the table.

Note that the table depicts 4 states (steps) which advance the rotor of the step motor in the CW direction when the table sequence is applied in the sequence 1, 2, 3, 4, 1 . . . , and will run the rotor of the step motor in the CCW direction when the sequence is 1, 4, 3, 2, 1 . . . .

Note also that only one phase is on at a time, and the current must be asserted for a period of time sufficient to permit the rotor of the step motor 1 to come to its new position. This time may be 0.01 or 0.001 second and is dependent on the motor characteristics. Also, since any motors not moving must not drift or move form the position to which they have been driven, sufficient friction is designed into the apparatus such that the mechanical load will not back drive the motors.

All of the motors 1 to 6 may alternatively be driven by the programmed selected sourcing or sinking pairs of the buffers B1 to B7 in order to individually power motor coils of the motors 1 to 6 respectively. An important element of this invention is that the matrix driver has no two motors sharing two buffers, although all buffers can either source or sink more than one motor coil. The use of the single phase on motor driver mode allows this with the reduction of wiring.

Additionally, stepper motors have a natural power off magnetic detent characteristic, and every interval of 4 steps will be near this magnetic detent position which will enhance the motors ability to 'stay put' in the de-powered state. This drive technique provides better performance in applications where there is less load friction.

An abbreviated matrix-connected driver for multiple two-phase motors matrix of motor coils is shown in FIG. 2. FIG. 2 shows the electronics requirement to support this matrix scheme. The buffer driver components U2, U3, U4, and U5 are for driving an abbreviated version of the matrix described above. The buffer components U2 through U5 are capable of sourcing or sinking the motor coil drive voltage. For example if the micro-controller U1 program asserts logic levels to these drivers U2 to U5 as shown in the examples below, they will energize the motor coils in a way that when properly sequenced by the micro-controller U1 in the one-coil-on-full-step mode, the motors can be rotated one direction or the other. The rows are Rows Y0 and Y1, while the Columns are Columns X0 and X1.

Y0=0, Y1=1, X0=1, X1=1, then current will source from the U4 driver through the coil 1A and sink back through U2 driver.

Y0=1, Y1=0, X0=0, X1=0, then current will source from the U2 driver through motor coil 1A (but now in the opposite direction), then sink back through the U4 driver.

All drivers U2 to U5 have an enable and disable feature, which is independently controllable by the micro-controller U1. In this state the driver neither sources nor sinks current.

This system may be applied in applications where the motor once positioned will stay in place. All step motors have some power off detent torque, which when power is removed from the step motor coil, will produce a magnetic torque to move toward a natural detent position, which is one out of 4 full step positions. If that produces sufficient mechanical resolution, this is no problem. However, to achieve the full step resolution capability of the motor, a mechanical friction must be present in the system, which will be greater than the detent force. Then, this system can move to any full step resolution position, disable the power to the motor and the motor will stay put.

The column and row configuration of the buffers engaged to the motor phases with no motor phase having the both the same input and output line may be used for various multiples of motors in matrix connected driver circuits. The number or types of motors or type of micro-controller may be varied while still being encompassed by the invention. The functional significance of the matrix-connected driver is that single phases of individual motors may be powered either high or low without powering other phases also electrically engaged to the powered phase through a common wire to a common buffer.

The use of a matrix-connected driver 301 may be motivated by having to operate remote motors located in extreme temperatures, radiation, remoteness of the environment, near vacuum or other isolated or hostile environments 250. This is so the requirements or chance of a requirement to access the hostile environment 250 will be minimized. An example is shown in FIG. 3. Mentioned above was the remote tuning of an RF filter. One can additionally imagine the driving of nuclear reactor vessel inside reactor core calibration probes or Traversing In-Core Probes. These hostile environments 250 may include a barrier 251 enclosing the hostile environment and for either protecting persons from the hostile environment or for maintaining the hostile environment 250. All barriers 251 work more efficiently when they have as few apertures or holes through them. This includes holes for wires, hence the advantages of this invention. The holes through a connector 313 can be minimized with the reduced driver wires for the invention.

The matrix-connected driver 301 operates in a similar fashion as described above with a controller 319 selected operating pairs buffers 302, 303, 304, 305, 306, and 307, with one from buffer 302 or 303, and one from 304, 305, 306, or 307, to source one buffer and sink the other to provide a current path across motor coils 201a, 201b, 202a, 202b, 203a, 203b, 204a, or 204b to drive the rotating elements or cores 201c, 202c, 203c, or 204c to drive one of motors 201 to 204. The buffers 302 and 303 are engaged to the motors 201 to 204 through column wires C1 or C2 through the connector 313 as shown. The buffers 304 to 307 are engaged to motors 201 to 204 through row wires R1 to R4.

As mentioned above, the most common modes of driving a step motor is in full step mode or half step mode, which requires that both field or winding coils (phases) be energized at once. This configuration could be accomplished in two matrixes; one matrix for the PhA and a different matrix for the PhB. In FIG. 4 matrix connected driver 401, there are two matrices of rows and columns driven from the same logic circuit 419, however more than one logic circuit is also suitable. Rows R1 and R2 along with Columns C1 and C2, being driven by buffers 406, 407, 405, and 404 constitute the A phase matrix to source or sink one of phase 10A, 11A, 12A, or 13A of one of 4 motors respectively. Rows R3 and R4 along with Columns C3 and C4, being driven by buffers 408, 409, 403, and 402 constitute the B phase matrix to source or sink on of phase 10B, 11B, 12B, or 13B of one of the 4 motors respectively. The operation of the matrix connected driver 401 is similar to that described above, with the exception that two pairs of buffers are operated to source or sink two winding coils at once to achieve the full step or half step mode of motor movement.

As described above, the matrix-connected driver for multiple two-phase motors and the isolated motor system with a matrix-connected driver for multiple two-phase motors of this invention provide a number of advantages, some of which have been described above and others of which are inherent in the invention. Also modifications may be proposed to the matrix-connected driver for multiple two-phase motors and the isolated motor system with a matrix-connected driver for multiple two-phase motors without departing from the teachings herein.

I claim:

1. A matrix-connected driver in combination with and for controlling multiple multi-phase motors, comprising:

a logic circuit separately engaged to control a set of buffers;

each buffer being separately controllable to either source a power source to a connecting line or to sink said connecting line to ground;

said buffer connecting lines being divided into rows and columns electrically connected to phases of multi-phase motors;

a first of said buffers being electrically engaged to a first row;

a second of said buffers being electrically engaged to a second row;

a third of said buffers being electrically engaged to a first column;

a fourth of said buffers being electrically engaged to a second column;

at least two multi-phase motors, a first motor and a second motor, each having at least two phases, an A phase and a B phase;

said A phase of said first motor being engaged between said first row and said first column;

said B phase of said first motor being engaged between said second row and said first column;

said A phase of said second motor being engaged between said first row and said second column;

said B phase of said second motor being engaged between said second row and said second column; and said logic circuit programmed to sequentially operate pairs of buffers, either one of said first or second buffers and one of said third or fourth buffers to either source or sink said columns and rows to individually power phases of a selected of one of said motors to cause said selected motor to rotate.

2. The matrix-connected driver motor combination of claim 1, wherein:
said buffers being electronic transistors.

3. The matrix-connected driver motor combination of claim 1, wherein:
said buffers being amplifier circuits.

4. The matrix-connected driver motor combination of claim 1, wherein:
said logic circuit being a micro-controller.

5. A matrix-connected driver in combination with and for controlling multiple multi-phase motors, comprising:
a logic circuit separately engaged to control a set of buffers;
each buffer being separately controllable to either source a power source to a connecting line or to sink said connecting line to ground;
said buffer connecting lines being divided into rows and columns electrically connected to phases of multi-phase motors;
wherein each row being electrically engaged to more than one phase of different motors;
wherein each column being electrically engaged to more than one phase of a different motor;
multiple multi-phase motors, each having multiple phases with each phase being connected to one row and one column, and each phase having a unique combination of row and column and associated unique operating buffer pairs; and
said logic circuit programmed to operate individual motors by sequentially operating individual phases through controlling unique combinations of pairs of buffers to operate individual motors in a single phase ON mode.

6. The matrix-connected driver motor combination of claim 5, wherein:
said buffers being electronic transistors.

7. The matrix-connected driver motor combination of claim 5, wherein:
said buffers being amplifier circuits.

8. The matrix-connected driver motor combination of claim 5, wherein:
said logic circuit being a micro-controller.

9. A matrix-connected driver for controlling multiple multi-phase motors, there being at least two multi-phase motors, a first motor and a second motor, each having at least two phases, an A phase and a B phase, comprising:
a logic circuit separately engaged to control a set of buffers;
each buffer being separately controllable to either source a power source to a connecting line or to sink said connecting line to ground;
said buffer connecting lines being divided into rows and columns electrically connected to phases of multi-phase motors;
a first of said buffers being electrically engaged to a first row;
a second of said buffers being electrically engaged to a second row;
a third of said buffers being electrically engaged to a first column;
a fourth of said buffers being electrically engaged to a second column;
a first connector within said first row and a second connector within said first column, said first and second connectors for engagement to the A phase of the first motor;
a third connector within said second row and a fourth connector within said first column, said third and fourth connectors for engagement to the B phase of the first motor;
a fifth connector within said first row and a sixth connector within said second column, said fifth and sixth columns for engagement to the A phase of the second motor;
a seventh connector within said second row and an eighth connector within said second column, said seventh and eighth connector for engagement to the B phase of the second motor; and
said logic circuit programmed to sequentially operate pairs of buffers, either one of said first or second buffers and one of said third or fourth buffers to either source or sink said columns and rows to sequentially and individually power phases of a selected of one of the motors to cause the selected motor to rotate.

10. The matrix-connected driver of claim 9, wherein:
said buffers being electronic transistors.

11. The matrix-connected driver of claim 9, wherein:
said buffers being amplifier circuits.

12. The matrix-connected driver of claim 9, wherein:
said logic circuit being a micro-controller.

13. A matrix-connected driver for controlling multiple multi-phase motors in combination with an isolated system with remote multi-purpose motors, comprising:
an isolated system enclosed by a barrier;
a logic circuit separately engaged to control a set of buffers;
said logic circuit and said buffers external to said barrier;
each buffer being separately controllable to either source a power source to a connecting line or to sink said connecting line to ground;
said buffer connecting lines being divided into rows and columns electrically connected to phases of multi-phase motors;
wherein each row being electrically engaged to more than one phase of different motors;
wherein each column being electrically engaged to more than one phase of a different motor;
wherein said motors being within said barrier and said connecting lines electrically passing through a connector within said barrier;
multiple multi-phase motors, each having multiple phases with each phase being connected to one row and one column, and each phase having a unique combination of row and column and associated unique operating buffer pairs; and
said logic circuit programmed to operate individual motors by sequentially operating individual phases through controlling unique combinations of pairs of buffers to operate individual motors in a single phase ON mode.

14. The matrix-connected driver isolated system combination of claim 13, wherein:
said buffers being electronic transistors.

15. The matrix-connected driver isolated system combination of claim 13, wherein:

said buffers being amplifier circuits.

16. The matrix-connected driver isolated system combination of claim 13, wherein:

said logic circuit being a micro-controller.

17. The matrix-connected driver isolated system combination of claim 13, wherein:

said barrier being for containing extreme temperatures.

18. The matrix-connected driver isolated system combination of claim 13, wherein:

said barrier being for containing radiation.

19. The matrix-connected driver isolated system combination of claim 13, wherein:

said barrier being for containing near vacuum.

20. A matrix-connected driver in combination with and for controlling multiple multi-phase motors, comprising:

a logic circuit separately engaged to control a set of buffers;

each buffer being separately controllable to either source a power source to a connecting line or to sink said connecting line to ground;

said buffer connecting lines being divided into rows and columns electrically connected to phases of multi-phase motors;

a first of said buffers being electrically engaged to a first row;

a second of said buffers being electrically engaged to a second row;

a third of said buffers being electrically engaged to a first column;

a fourth of said buffers being electrically engaged to a second column;

a fifth of said buffers being electrically engaged to a third row;

a sixth of said buffers being electrically engaged to a fourth row;

a seventh of said buffers being electrically engaged to a third column;

an eighth of said buffers being electrically engaged to a fourth column;

at least four multi-phase motors, a first motor, a second motor, a third motor, and a fourth motor, each having at least two phases, an A phase and a B phase;

said A phase of said first motor being engaged between said first row and said first column;

said B phase of said first motor being engaged between said third row and said third column;

said A phase of said second motor being engaged between said second row and said first column;

said B phase of said second motor being engaged between said fourth row and third column;

said A phase of said third motor being engaged between said first row and said second column;

said B phase of said third motor being engaged between said third row and said fourth column;

said A phase of said fourth motor being engaged between said second row and said second column;

said B phase of said fourth motor being engaged between said fourth row and fourth column;

said logic circuit programmed to sequentially operate two pairs of buffers, either one of said first or second buffers and one of said third or fourth buffers for a first buffer pair, and one of said fifth or sixth buffers and one of said seventh or eighth buffers for a second buffer pair, to either source or sink said columns and rows to individually power two phases of a selected of one of said motors to cause said selected motor to rotate.

21. The matrix-connected driver motor combination of claim 20, wherein:

said buffers being electronic transistors.

22. The matrix-connected driver motor combination of claim 20, wherein:

said buffers being amplifier circuits.

23. The matrix-connected driver motor combination of claim 20, wherein:

said logic circuit being a micro-controller.

* * * * *